United States Patent
Smith, Jr.

[11] 3,749,265
[45] July 31, 1973

[54] WHEEL DOLLY

[76] Inventor: Raymond P. Smith, Jr., 120 W. Lincoln Ave., So. Williamsport, Pa.

[22] Filed: Dec. 28, 1971

[21] Appl. No.: 212,999

[52] U.S. Cl. .................................. 214/331, 187/9
[51] Int. Cl. ............................................ B60b 29/00
[58] Field of Search .................. 214/330, 331, 332, 214/333, 334, 141; 187/9

[56] References Cited
UNITED STATES PATENTS

| | | | |
|---|---|---|---|
| 1,555,152 | 9/1925 | Passow | 214/331 |
| 2,516,260 | 7/1950 | Schildmeier | 214/331 |
| 3,396,860 | 8/1968 | Witwer et al. | 214/141 |
| 3,145,859 | 8/1964 | Barosko | 214/331 |

Primary Examiner—Gerald M. Forlenza
Assistant Examiner—Lawrence J. Oresky
Attorney—John N. Randolph

[57] ABSTRACT

A wheel dolly to facilitate mounting and demounting large vehicle wheels and tires, including brake assemblies, and which is especially adapted for use in connection with dual rear truck wheels. The dolly includes a lift frame on which the wheels and tires are supported for raising and lowering the wheels and tires to facilitate their removal from or application to a vehicle. A mobile dolly frame provides a support for the lift frame to enable a wheel or wheels and tire or tires to be readily conveyed to and from the vehicle.

1 Claim, 8 Drawing Figures

PATENTED JUL 31 1973 3,749,265

INVENTOR
RAYMOND P. SMITH, JR.
BY John N. Randolph
ATTORNEY

PATENTED JUL 31 1973 3,749,265
SHEET 2 OF 2
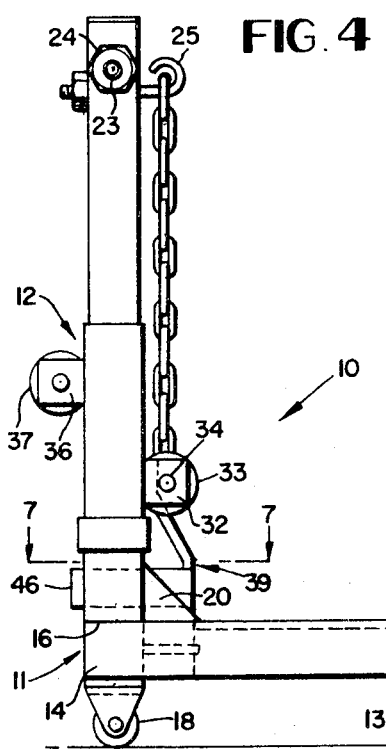
FIG. 4
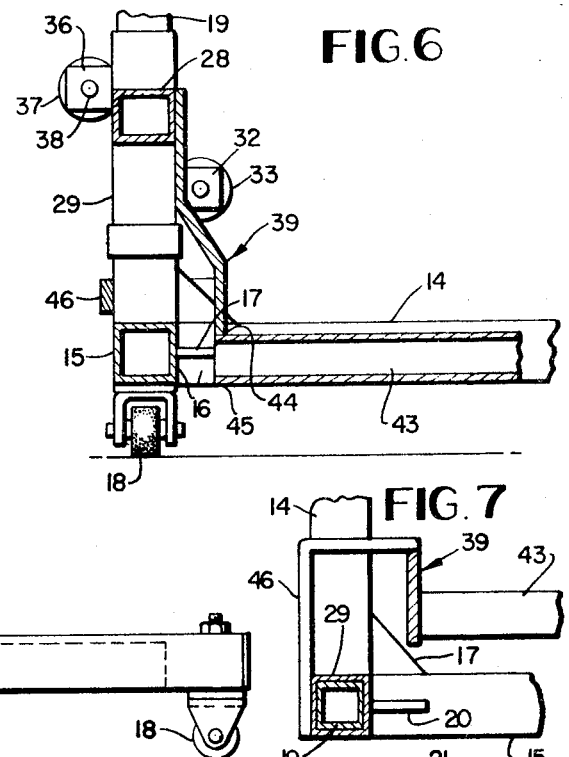
FIG. 6
FIG. 7
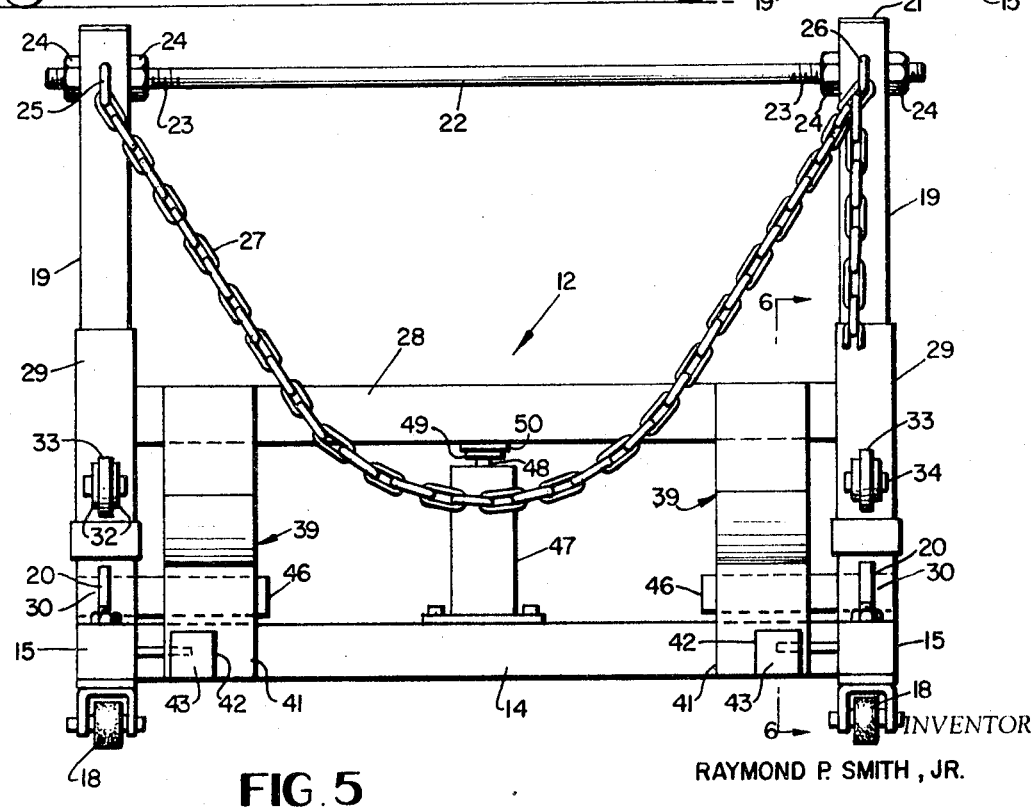
FIG. 5
INVENTOR
RAYMOND P. SMITH, JR.
BY *John N. Randolph*
ATTORNEY

WHEEL DOLLY

SUMMARY

It is a primary object of the present invention to provide a wheel dolly which will effectively function for supporting large vehicle wheels and tires, with or without a brake assembly, at different elevations for movement to and from a vehicle, such as a truck, to facilitate the mounting and demounting of wheels and tires that cannot be readily lifted manually.

Another object of the invention is to provide a wheel dolly of simple construction capable of being economically manufactured and sold, which will be extremely durable, and capable of supporting large wheels and axles, for raising and lowering such parts to facilitate their application to or removal from a vehicle.

A further object of the invention is to provide a wheel dolly constructed primarily of metal tubing to afford maximum strength with a minimum of weight.

Still another object of the invention is to provide a wheel dolly including a lift frame having means to minimize frictional resistance to up-and-down movement of the lift frame relative to the dolly frame on which it is supported for vertical movement.

Various other objects and advantages of the invention will hereinafter become more fully apparent from the following description of the drawings, illustrating a presently preferred embodiment thereof, and wherein:

BRIEF DESCRIPTION OF THE DRAWINGS

FIG. 4 is an enlarged side elevational view of the wheel dolly with the lift frame in a lowered position;

FIG. 5 is a front elevational view of the wheel dolly as seen in FIG. 4;

FIG. 6 is a fragmentary vertical sectional view, taken substantially along a plane as indicated by the line 6—6 of FIG. 5;

FIG. 7 is a fragmentary horizontal sectional view, taken substantially along a plane as indicated by the line 7—7 of FIG. 4.

DESCRIPTION OF THE PREFERRED EMBODIMENT

Figure 1:
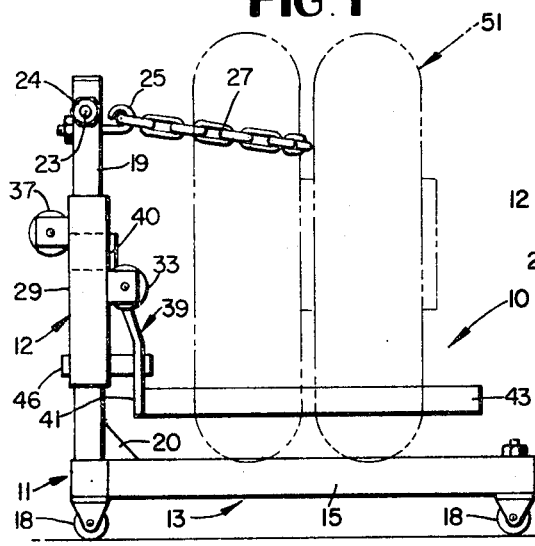
FIG. 1 is a side elevational view showing the wheel dolly with the lift frame in an elevated position.

Referring more specifically to the drawings, the wheel dolly in its entirety and comprising the invention is designated generally 10 and includes a dolly frame 11 and a lift frame 12.

The dolly frame 11 includes an U-shaped base 13 provided with a rear portion 14 and corresponding sides 15. The sides 15 are disposed substantially parallel to one another and at right angles to the rear portion 14. The parts 14 and 15 are preferably formed of metal tubing of non-circular cross section, and corresponding ends of the side members 15 are secured as by welding, as seen at 16, to the rear member 14, adjacent the ends of said member 14. The connections between the members 14 and 15 are reinforced by gussets 17 which are likewise secured by welding, as indicated at 16, in the corners formed by the parts 14 and 15.

Caster wheels 18 are swively attached to and disposed beneath the ends of the rear member 14 and the outer ends of the side members 15 to provide a mobile support for the dolly frame 11. Said caster wheels 18 are each capable of revolving a complete revolution in either direction beneath the base 13.

The dolly frame 11 also includes a pair of uprights or posts 19 which are secured, as by additional welds 16, to the ends of the rear member 14 and which rise vertically therefrom. The uprights or posts 19 are additionally reinforced or braced by gussets 20 which are secured thereto and to the sides 15. Uprights 19 are likewise formed of tubular material, corresponding with parts 14 and 15, and the exposed ends of the members 14, 15 and 19 are closed and sealed by caps 21.

A rod 22, forming a handle, extends between the uprights 19 and has threaded ends 23 extending through upper portions of said uprights. Nuts 24 engage the threaded ends 23 and the uprights 19 for retaining the rod 22 in place. An eye bolt 25 is secured through one of the uprights 19, adjacent to the rod 22, and a hook 26 is secured through the other upright 19, at substantially the same elevation. One end of a chain 27 is secured to the eye bolt 25 and a selected link of the chain engages the hook 26, as seen in FIG. 8.

The lift frame 12 includes a tubular cross member 28 to the ends of which are secured corresponding tubular sleeves 29 which are disposed parallel to one another and perpendicular to the cross member 28. The sleeves 29 are of a cross sectional size and shape to fit slidably on the uprights 19 and are of a length substantially less than the length of said uprights. The front walls of the sleeves 29 have downwardly opening slots 30 to accommodate the gussets 20, in the bottommost position of the lift frame 12, as illustrated in FIGS. 4 and 5.

Figure 8:
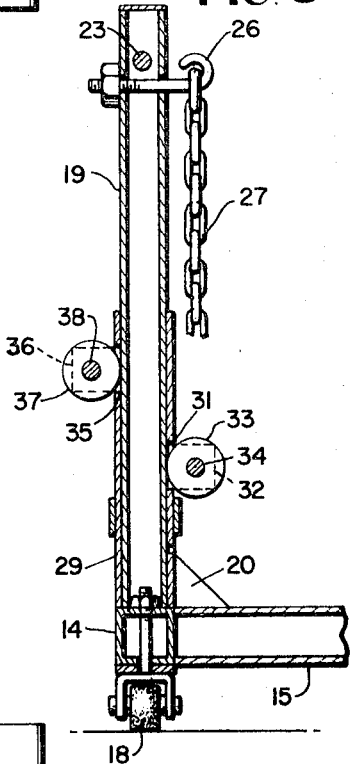
FIG. 8 is a fragmentary vertical sectional view, taken substantially along a plane as indicated by the line 8—8 of FIG. 3.

Said front walls of the sleeves 29, above the slots 30, are provided with vertically elongated slots 31, FIG. 8. A pair of transversely spaced ears 32 are secured to and extend outwardly from each sleeve 29, on each side of the slot 31 thereof, to receive therebetween a sealed roller bearing 33 which is journaled on an axle 34, which extends through the ears 32. Bearing 33 has a portion of its periphery extending inwardly through the slot 31 to bear against the front face of the post 19 on which said sleeve is mounted. The rear wall of each sleeve 29 has a vertically elongated slot at 35, ears 36, roller bearing 37 and axle 38, corresponding to the parts 31, 32 33 and 34, respectively, and which are located above the level of said parts 31 to 34. Thus, the roller bearings 37 bear against the rear walls of the uprights 19 above the level of the roller bearings 33.

Figure 3:
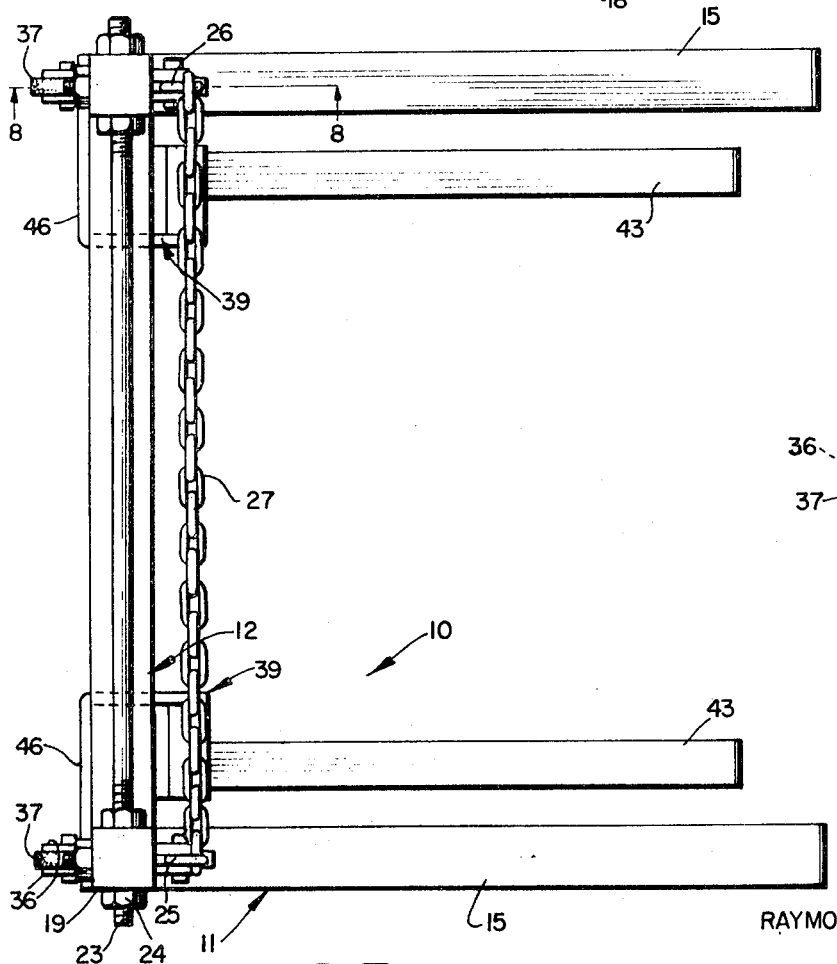
FIG. 3 is an enlarged top plan view of the wheel dolly.

Rigid strap members 39, forming supporting brackets, have upper ends disposed against and secured to the front side of the cross member 28, adjacent the ends thereof. Said upper ends may be secured as by welding, as indicated at 40, in FIG. 1, to cross member 28. The members 39 have forwardly offset lower ends 41 which terminate at approximately the level of the underside of the base 13, when the lift frame 12 is in its lowermost position of FIG. 5. Said lower ends 41 are each provided with a notch 42 to receive an inner end of a supporting arm 43 which is secured therein as by welding, as seen at 44 in FIG. 6. The opposite outer ends of the supporting arms 43 terminate inwardly or rearwardly of the outer or forward ends or the frame sides 15, as seen in FIG. 3, and said arms 43 are disposed between and spaced from the sides 15, in the lowered position of the lift frame 12. The tubular arms 43 are also of non-circular cross section and have caps 45 closing and sealing the ends thereof. A brace 46 extends between each sleeve 29 and the lower portion 41 of the bracket 39, located adjacent thereto, and is rigidly secured to said parts for bracing the brackets.

A conventional fluid pressure operated jack, such as an hydraulic jack 47, has a base resting on and secured to the rear frame member 14, midway of its ends. The piston rod 48 of the jack 47 has a head 49 at its upper end which bears against a pad 50 on the underside of the cross member 28.

Assuming that lift frame 12 is in its lowermost position of FIGS. 4 to 6, an operator grasping the handle 22 can propel the frame forwardly to move the lift arms 42 under a single or dual wheel of a truck, which wheel has been jacked up in a conventional manner. Fluid is then supplied in a conventional manner to the jack 47 for elevating the lift frame 12 so that the support arms 42 will be raised into engagement with the tire or tires of the wheel or wheels, respectively. The wheel or wheels can then be disconnected in a conventional manner by removing the lug fastenings. The chain 27 is unfastened from the hook 26 and is passed around the wheel or between the dual wheels and reengaged with the hook 26. A pair of wheels and tires, designated generally 51, is illustrated in broken lines in FIGS. 1 and 2, supported on the lift arms 43 and held in substantially upright positions by the chain 27, so that when the dolly 10 is pulled from right to left of FIG. 1, the wheels 51 will be detached from the vehicle, not shown, and may be readily conveyed on the dolly 10 to any desired location. The casters 18 enable the dolly 10 to be readily steered.

It will also be apparent that the dolly 10 can be used for positioning the wheels 51 to be mounted on the vehicle and the lift assembly 12 can be raised or lowered to accurately position the wheel openings, not shown, to receive the lug fastenings of the vehicle. In this connection, the chain 27 functions to maintain the wheels 51 in correct upright position for application to the vehicle.

Figure 2:
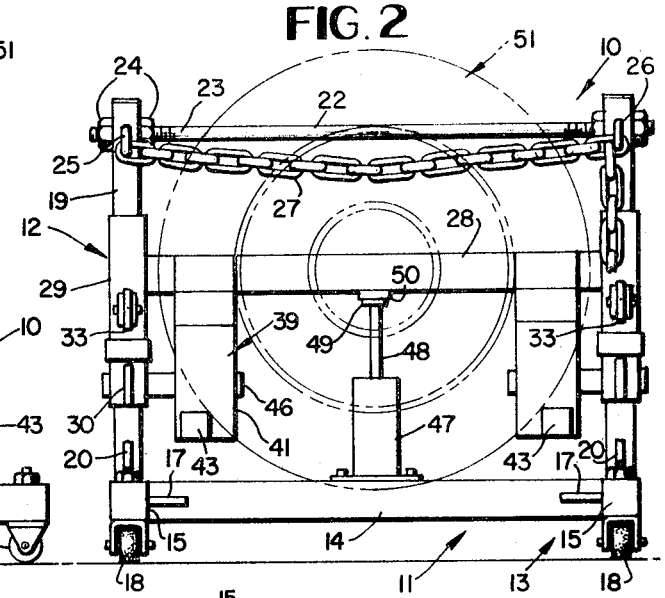
FIG. 2 is a front elevational view thereof, looking from right to left of FIG. 1.

It will also be readily apparent that the weight of the wheels 51 tend to cause the lift frame 12 to rock clockwise from its position of FIG. 1. However, the upper roller bearings 37 will prevent the upper portions of the rear walls of the sleeves 29 from moving inwardly of the uprights 19 and the front roller bearings 33 will prevent any angular movement of the front walls of the sleeves 29 relative to the posts 19, so that any canting of the sleeves relative to the posts, which would tend to cause binding, is avoided. Thus, the lift assembly 12 will slide freely on posts 19 of the dolly frame 11 when the jack 47 is pressurized to raise the lift frame 12 or is bled to allow the lift frame to descend.

Various modifications and changes are contemplated and may be resorted to without departing from the function or scope of the invention.

I claim:

1. A wheel dolly comprising a mobile dolly frame having a substantially U-shaped base provided with an open front and including spaced apart substantially parallel frame sides, corner posts fixed to and rising from the rear corners of the frame base, said frame base including a rear member extending between the rear ends of said frame sides and combining therewith to form said rear corners; a lift frame including a pair of sleeve members slidably mounted on said corner posts, a cross member extending between and secured to said sleeve members and disposed above and spaced from said rear base member in a lowermost position of the lift frame, support members secured to and depending from said cross member and having lower ends disposed forwardly of said rear frame member, in the lowermost position of the lift frame, a lift arm fixed to and extending forwardly from each support member, said lift arms being disposed in spaced apart substantially parallel relation to one another and between said frame sides and being adapted to engage under a tire or tires of a vehicle wheel, a fluid pressure responsive jack mounted on said rear frame member and engaging under said cross member for raising the lift frame and the tires and wheels supported thereby relative to the dolly frame, flexible means connected to the uprights and adapted to engage around a wheel and tire supported by said lift arms for maintaining the wheel and tire in upright positions, a rod extending between upper ends of said corner posts and having threaded ends extending through the corner posts, nuts engaging said threaded rod ends and bearing against opposite sides of both corner posts for maintaining the corner posts in upright parallel relation to one another and for providing a handle adapted to be manually engaged for propelling and guiding the wheel dolly, said sleeve members having openings in the front and rear sides thereof, and anti-friction bearing members carried by said sleeve members and extending into said openings and engaging front and rear surfaces of the corner posts to prevent binding engagment between the sleeve members and corner posts, said bearing members engaging the rear sides of the corner posts above the level of the bearing members engaging the front sides of the corner posts.

* * * * *